United States Patent
Liang et al.

(10) Patent No.: US 11,695,112 B2
(45) Date of Patent: Jul. 4, 2023

(54) NEGATIVE ELECTRODE ACTIVE MATERIAL, PROCESS FOR PREPARING THE SAME, AND SECONDARY BATTERY, BATTERY MODULE, BATTERY PACK AND APPARATUS RELATED TO THE SAME

(71) Applicant: Contemporary Amperex Technology Co., Limited, Ningde (CN)

(72) Inventors: Chengdu Liang, Ningde (CN); Yuzhen Zhao, Ningde (CN); Yingjie Guan, Ningde (CN); Yan Wen, Ningde (CN); Qisen Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/553,839

(22) Filed: Dec. 17, 2021

(65) Prior Publication Data
US 2022/0140325 A1    May 5, 2022

Related U.S. Application Data

(63) Continuation of application No. PCT/CN2020/103253, filed on Jul. 21, 2020.

(30) Foreign Application Priority Data

Jul. 29, 2019 (CN) .......................... 201910689510.7

(51) Int. Cl.
*H01M 4/04* (2006.01)
*H01M 4/38* (2006.01)
*H01M 4/02* (2006.01)

(52) U.S. Cl.
CPC ......... *H01M 4/386* (2013.01); *H01M 4/0416* (2013.01); *H01M 4/387* (2013.01); *H01M 2004/027* (2013.01)

(58) Field of Classification Search
None
See application file for complete search history.

(56) References Cited

U.S. PATENT DOCUMENTS

2014/0272572 A1   9/2014   Chu et al.
2015/0064552 A1   3/2015   Huang et al.

FOREIGN PATENT DOCUMENTS

CN        103456928 A      12/2013
CN        103618071 A       3/2014
(Continued)

OTHER PUBLICATIONS

The International search report for PCT Application No. PCT/CN2020/103253, dated Oct. 21, 2020, 11 pages.
(Continued)

*Primary Examiner* — Tracy M Dove
(74) *Attorney, Agent, or Firm* — East IP P.C.

(57) ABSTRACT

The present application provides a negative electrode active material, a process for preparing the same, and a secondary battery, a battery module, a battery pack and an apparatus related the same. The negative electrode active material comprises a core material and a polymer-modified coating layer on at least a part of a surface of the core material, the core material is one or more of a silicon-based negative electrode material and a tin-based negative electrode material, the polymer-modified coating layer comprises sulfur element and carbon element, the sulfur element has a mass percentage of from 0.2% to 4% in the negative electrode active material, the carbon element has a mass percentage of from 0.5% to 4% in the negative electrode active material, and the polymer-modified coating layer comprises a —S—C— bond.

15 Claims, 2 Drawing Sheets

(56) References Cited

FOREIGN PATENT DOCUMENTS

| | | |
|---|---|---|
| CN | 103688395 A | 3/2014 |
| CN | 104241612 A | 12/2014 |
| CN | 104393299 A | 3/2015 |
| CN | 106025225 A | 10/2016 |
| CN | 104334613 B | 12/2016 |
| CN | 105140477 B | 2/2018 |
| CN | 109103441 A | 12/2018 |
| CN | 109904394 A | 6/2019 |
| CN | 110010861 A | 7/2019 |
| JP | 2020019702 A | 2/2020 |
| JP | 2020521279 A | 7/2020 |
| KR | 1020190083613 A | 7/2019 |

OTHER PUBLICATIONS

The First Office Action for IN Application No. 202117057390, dated Apr. 8, 2022, 5 pages.
The extended European search report for European Application No. 20848088.9, dated Apr. 19, 2022, 8 pages.
The First Office Action for JP Application No. 2021-544587, dated Oct. 17, 2022, 6 pages.
The First Office Action dated Apr. 14, 2023 for Korean Application No. 10-2021-7024295, 14 Pages.
Wojciech Kicinski et al., "Sulfur-doped porous carbons: Synthesis and applications", Carbon 68 (2014) 1-32, 32 Pages.

NEGATIVE ELECTRODE ACTIVE MATERIAL, PROCESS FOR PREPARING THE SAME, AND SECONDARY BATTERY, BATTERY MODULE, BATTERY PACK AND APPARATUS RELATED TO THE SAME

CROSS-REFERENCE TO RELATED APPLICATION

This is a continuation of International Application No. PCT/CN2020/103253 filed on Jul. 21, 2020, which claims priority to Chinese Patent Application No. 201910689510.7 entitled "Negative Electrode Active Material and Secondary Battery" and filed on Jul. 29, 2019, both of which are incorporated herein by reference in their entireties.

TECHNICAL FIELD

This application relates to the field of batteries, and specifically to a negative electrode active material, a process for preparing the same, and a secondary battery, a battery module, a battery pack and an apparatus related to the same.

BACKGROUND

In recent years, due to the higher requirement of the electric vehicle industry for energy density, a lot of research has been carried out into high-capacity negative electrode active materials. Silicon-based and tin-based materials are valued for their relatively high theoretical gram capacity. Nevertheless, the silicon-based and tin-based materials suffer from serious volume effects, which will cause huge volume expansion during charging. As a result, during charging and discharging, the negative electrode active material is easily broken to be pulverized, and thus is difficult to form a stable SEI film on its surface. This leads to overly fast fading of the battery capacity and very poor cycle performance. In addition, silicon, as a semiconductor material, has defects of relatively low electrical conductivity and relatively serious irreversibility of active ions during charging and discharging, which would also affect the cycle performance of batteries.

SUMMARY

The first aspect of the present application provides a negative electrode active material, comprising a core material and a polymer-modified coating layer on at least part of a surface of the core material, the core material is one or more of a silicon-based negative electrode material and a tin-based negative electrode material, the polymer-modified coating layer comprises sulfur element and carbon element, the sulfur element has a mass percentage of from 0.2% to 4% in the negative electrode active material, the carbon element has a mass percentage of from 0.5% to 4% in the negative electrode active material, and the polymer-modified coating layer includes a —S—C— bond.

It is surprisingly found that the negative electrode active material of the present application includes a core material and a polymer-modified coating layer on at least part of a surface of the core material, the core material is one or more of a silicon-based negative electrode material and a tin-based negative electrode material, and the polymer-modified coating layer comprises a proper amount of sulfur element and carbon element and comprises a —S—C— bond; accordingly, the negative electrode active material of the present application can reduce damage to the surface structure of the negative electrode active material during charging and discharging of a battery, reduce loss of active ions, and reduce capacity loss of the battery, and therefore, coulombic efficiency and cycle performance of the battery can be well improved.

In any embodiment as mentioned above according to the first aspect of the present application, the sulfur element has a mass percentage of from 0.7% to 2% in the negative electrode active material. Under the condition that the content of the sulfur element in the negative electrode active material falls within the above range, the cycle performance and energy density of the secondary battery can be further improved.

In any embodiment as mentioned above according to the first aspect of the present application, the carbon element has a mass percentage of from 0.9% to 3% in the negative electrode active material. Under the condition that the content of the carbon element in the negative electrode active material falls within the above range, the cycle performance and energy density of the secondary battery can be improved.

In any embodiment as mentioned above according to the first aspect of the present application, the polymer-modified coating layer further comprises a —S—S— bond. The —S—S— bond enables the polymer-modified coating layer to have relatively high active ion conductivity, and also ensures the protecting effect of the polymer-modified coating layer to the core material, thereby further improving the cycle performance of the battery.

In any embodiment as mentioned above according to the first aspect of the present application, the negative electrode active material has a volume average particle size $D_v50$ of from 2 μm to 12 μm, and optionally from 3 μm to 8 μm.

In any embodiment as mentioned above according to the first aspect of the present application, the negative electrode active material has a volume particle size distribution width $(D_v90-D_v10)/D_v50$ of from 0.5 to 2.5, and optionally from 0.8 to 2.0. Under the condition that $D_v50$ of the negative electrode active material falls within the above range, the cycle performance of the secondary battery can be further improved, and the negative electrode film would readily obtain a relatively high compacted density, thereby increasing the energy density of the secondary battery.

In any embodiment as mentioned above according to the first aspect of the present application, the negative electrode active material has a specific surface area BET of from 0.5 $m^2/g$ to 6 $m^2/g$, and optionally from 0.8 $m^2/g$ to 5 $m^2/g$. Under the condition that the specific surface area of the negative electrode active material falls within an appropriate range, the secondary battery can have desired dynamics performance and rate performance and meanwhile have further improved the cycle performance.

In any embodiment as mentioned above according to the first aspect of the present application, the negative electrode active material has a compacted density of from 1.0 $g/cm^3$ to 2.0 $g/cm^3$, optionally from 1.2 $g/cm^3$ to 1.5 $g/cm^3$, measured under a pressure of 5 tons (equivalent to 49 KN). Under the condition that the compacted density of the negative electrode active material measured under the pressure of 49 KN falls within the above range, it is beneficial for increasing the energy density of the secondary battery.

In any embodiment as mentioned above according to the first aspect of the present application, the negative electrode active material has a tap density of from 0.5 $g/cm^3$ to 1.5 $g/cm^3$, optionally from 0.6 $g/cm^3$ to 1.2 $g/cm^3$. Under the condition that the tap density of the negative electrode active material falls within the above range, it is beneficial for increasing the energy density of the secondary battery.

In any embodiment as mentioned above according to the first aspect of the present application, the silicon-based negative electrode material is one or more selected from elemental silicon, a silicon-carbon composite, a silicon-oxygen compound, a silicon-nitrogen compound, and a silicon alloy; optionally, the silicon-based negative electrode material is selected from a silicon-oxygen compound; and the tin-based negative electrode material is one or more selected from elemental tin, a tin-oxygen compound, and a tin alloy. These materials have relatively high gram capacity, so that the secondary batteries using the same have relatively high energy density.

The second aspect of the present application provides a process for preparing a negative electrode active material, comprising the following steps:

(1) dissolving a polymer precursor in a solvent, and stirring until uniform dispersion, to obtain a solution of the polymer precursor;

(2) adding a core material into the solution of the polymer precursor, and stirring, to obtain a mixed slurry, wherein the core material is one or more selected from a silicon-based negative electrode material and a tin-based negative electrode material;

(3) drying the mixed slurry in an inert non-oxidizing gas atmosphere, to obtain a solid powder; and (4) mixing the solid powder with a sulfur powder to obtain a mixture, and subjecting the mixture to heat treatment under an inert non-oxidizing gas atmosphere, to obtain the negative electrode active material;

wherein the negative electrode active material comprises the core material and a polymer-modified coating layer on at least part of the surface of the core material, the polymer-modified coating layer comprises sulfur element and carbon element, the sulfur element has a mass percentage of from 0.2% to 4% in the negative electrode active material, the carbon element has a mass percentage of from 0.5% to 4% in the negative electrode active material, and the polymer-modified coating layer includes a —S—C— bond.

The negative electrode active material obtained by the process of the present application comprises a core material and a polymer-modified coating layer on at least part of a surface of the core material, wherein the core material is one or more of a silicon-based negative electrode material and a tin-based negative electrode material, and the polymer-modified coating layer comprises a proper amount of sulfur element and carbon element and comprises a —S—C— bond; accordingly, the negative electrode active material obtained by the process of the present application can reduce damage to the surface structure of the negative electrode active material during charging and discharging of a battery, reduce loss of active ions, and reduce capacity loss of the battery, and therefore, coulombic efficiency and cycle performance of the battery can be well improved.

In any embodiment as mentioned above according to the second aspect of the present application, the polymer precursor comprises one or more of polystyrene, polyvinyl chloride, polyethylene, polyacrylonitrile, polyaniline, polyacetylene, and polyvinylidene chloride. The coating layer based on the polymer precursor can provide effective protection for the core material and improve the electronic conductivity of the negative electrode active material, thereby helping to improve the cycle performance of the secondary battery.

In any embodiment as mentioned above according to the second aspect of the present application, in step (1), the mass ratio of the polymer precursor to a volume of the solvent is from 0.1 g/L to 20 g/L, and optionally from 0.5 g/L to 10 g/L. The appropriate addition of a polymer is beneficial for improving the particle size distribution of the negative electrode active material. In particular $D_v10$, $D_v50$ and $D_v90$ of the negative electrode active material may be elected to fall within appropriate ranges, so as to improve the energy density and cycle performance of the secondary battery.

In any embodiment as mentioned above according to the second aspect of the present application, in step (2), the mass ratio of the core material to the polymer precursor is from 7 to 200, and optionally from 12 to 100. Under the condition that the mass ratio of the core material to the polymer precursor falls within the appropriate range, it is beneficial for enabling the secondary battery to have relatively high energy density and cycle performance.

In any embodiment as mentioned above according to the second aspect of the present application, in step (4), a mass percentage of the sulfur powder to the polymer precursor is from 1 to 5, and optionally from 2 to 4. Under the condition that the mass percentage of the sulfur powder to the polymer precursor falls within the above range, it is beneficial for enabling the secondary battery to obtain higher cycle performance.

In any embodiment as mentioned above according to the second aspect of the present application, the heat treatment temperature is from 250° C. to 450° C., and optionally from 300° C. to 450° C. Under the condition that the heat treatment temperature falls within the above range, the cycle performance of the secondary battery can be improved.

In any embodiment as mentioned above according to the second aspect of the present application, the heat treatment time is from 2 h to 8 h, and optionally from 3 h to 5 h.

The third aspect of the present application provides a secondary battery, comprising the negative electrode active material according to the first aspect of the present application or the negative electrode active material obtained according to the process of the second aspect of the present application.

The secondary battery of the present application adopts the negative electrode active material of the present application, and therefore can have relatively high energy density, initial Coulombic efficiency and cycle performance at the same time.

The fourth aspect of the present application provides a battery module, comprising the secondary battery according to the third aspect of the present application.

The fifth aspect of the present application provides a battery pack, comprising the battery module according to the fourth aspect of the present application.

The sixth aspect of the present application provides an apparatus, comprising at least one of the secondary battery according to the third aspect of the present application, the battery module according to the fourth aspect of the present application, or the battery pack according to the fifth aspect of the present application.

The battery module, the battery pack, and the apparatus of the present application comprise the secondary battery as described in the present application, and therefore at least have technical effects the same with or similar to the secondary battery.

DETAILED DESCRIPTION

Figure 1:
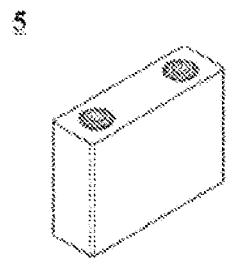
FIG. 1 is a schematic diagram of a secondary battery according to one embodiment.

The negative electrode active material and secondary battery according to the present application will be described in detail below.

For the sake of brevity, only certain numerical ranges are explicitly disclosed herein. However, any lower limit may be combined with any upper limit to form a range that is not explicitly described; and any lower limit may be combined with other lower limits to form an unspecified range, likewise, any upper limit may be combined with any other upper limit to form an unspecified range. Further, although not explicitly specified, each point or single value between the endpoints of the range is included in the range. Thus, each point or single value, as its own lower limit or upper limit, can be combined with any other point or single value or combined with other lower limit or upper limit to form a range that is not explicitly specified.

In the description herein, it should be noted that, unless otherwise specified, a numeric range described with the term "no less than" or "no more than" includes all numbers within that range including the endpoints, and "more" in "one or more" means two or more than two.

In the above-stated summary of the invention, it is not intended to describe each embodiment or implementation disclosed in this application. The following description illustrates exemplary embodiments more specifically. In many places throughout the application, guidance is provided by means of a series of embodiments, which can be applied in various combinations. In each embodiment, the enumeration is only a representative group and should not be interpreted as exhaustive.

First, a negative electrode active material according to the first aspect of the present application will be described.

The negative electrode active material of the present application includes a core material and a polymer-modified coating layer on at least part of a surface of the core material, the core material is one or more of a silicon-based negative electrode material and a tin-based negative electrode material, the polymer-modified coating layer includes sulfur element and carbon element, the sulfur element has a mass percentage of from 0.2% to 4% in the negative electrode active material, the carbon element has a mass percentage of from 0.5% to 4% in the negative electrode active material, and the polymer-modified coating layer includes a —S—C— bond.

When a battery is charged for the first time, a SEI film will form on the surface of the negative electrode active material. Nevertheless, due to the relatively serious volume effect of the silicon-based negative electrode material and the tin-based negative electrode material, the SEI film on the surface of the negative electrode active material will be subjected to repeated breaking and repairing during charging and discharging of the battery. This will consume a large amount of active ions, thereby reducing the Coulombic efficiency of the battery and increasing the irreversibility of active ions. In addition, under the condition that the SEI film on the surface of the negative electrode active material breaks, the exposed negative electrode active material would contact with the electrolyte directly, which may increase side reactions on the surface of the negative electrode active material. Moreover the structure of the negative electrode active material would be damaged easily under the erosion of the electrolyte, which will accelerate the attenuation of battery capacity.

According to this application, a polymer-modified coating layer is applied on the surface of the silicon-based negative electrode material and the tin-based negative electrode material. The polymer modified coating layer according to the present application, as compared with the conventional inorganic carbon layer in the industry, has better elasticity and toughness and can better adapt to the expansion and contraction of the silicon-based negative electrode material and the tin-based negative electrode material during charging and discharging of the battery. Moreover, the polymer modified coating layer according to the present application ensures the formation of a more stable SEI film on the surface of the negative electrode active material, thereby avoiding the consumption of a large amount of active ions due to repeated breaking and repairing of the SEI film. In addition, it can also ensure that the SEI film could always isolate the negative electrode active material from the electrolyte and thus avoiding direct contact therebetween during the charging and discharging of the battery. Therefore, the side reaction on the surface of the negative electrode active material and the damage to the surface structure of the negative electrode active material due to the erosion of the electrolyte are reduced, and thus the capacity loss of the battery is reduced.

In the negative electrode active material of the present application, the polymer-modified coating layer includes sulfur element and carbon element.

The sulfur element has a mass percentage of from 0.2% to 4% in the negative electrode active material. For example, the mass percentage of the sulfur element in the negative electrode active material may be ≤4.0%, ≤3.8%, ≤3.5%, ≤3.2%, ≤3.0%, ≤2.8%, ≤2.5%, ≤2.2%, ≤2.0%, ≤1.8%, or ≤1.5%. The mass percentage of the sulfur element in the negative electrode active material may be ≥0.2%, ≥0.3%, ≥0.4%, ≥0.5%, ≥0.6%, ≥0.7%, ≥0.8%, ≥0.9%, ≥1.0%, ≥1.1%, ≥1.2%, ≥1.3%, ≥1.4%, or ≥1.5%. Optionally, the mass percentage of the sulfur element in the negative electrode active material is from 0.7% to 2%, or from 0.8% to 1.95%, etc.

The carbon element has a mass percentage of from 0.5% to 4% in the negative electrode active material. For example, the mass percentage of the carbon element in the negative electrode active material may be ≤4.0%, ≤3.8%, ≤3.5%, ≤3.2%, ≤3.0%, ≤2.8%, ≤2.5%, ≤2.2%, ≤2.0%, ≤1.8%, or ≤1.5%. The mass percentage of the carbon element in the negative electrode active material may be ≥0.5%, ≥0.6%, ≥0.7%, ≥0.8%, ≥0.9%, ≥1.0%, ≥1.1%, ≥1.2%, ≥1.3%, ≥1.4%, or ≥1.5%. Optionally, the mass percentage of the carbon element in the negative electrode active material is from 0.9% to 3%, or from 0.95% to 2.0%, etc.

The polymer-modified coating layer of the present application includes a —C—S— bond, and thus the polymer-modified coating layer has relatively high elasticity and toughness, so as to well adapt to the expansion and contraction of the silicon-based material and the tin-based material during lithiation and delithiation. As a result, the loss of active ions due to the breaking and repairing of the SEI film is reduced on the one hand, and on the other hand, the core material is protected, and the capacity loss caused by damage of the surface of the core material is reduced accordingly.

Thus, the present application can reduce damage to the surface structure of the negative electrode active material during charging and discharging of the battery, reduce loss of active ions, and reduce capacity loss of the battery, and therefore, the present application can well improve the Coulombic efficiency and cycle performance of the battery.

In some embodiments, the polymer-modified coating layer further includes a —S—S— bond. The —S—S— bond enables the polymer-modified coating layer to have relatively high active ion conductivity. During charging of the battery, the —S—S— bond breaks and bonds with active ions for ion migration at relatively high migration rate; during discharging of the battery, the active ions deintercalate and the —S—S— bond re-bonds. During the charging and discharging of the battery, only —S—S— bond breaks and bonds, and the structure of the carbon-based skeleton remains unchanged, which ensures the protective effect of the polymer-modified coating layer on the core material, and thus can better improve the cycle performance of the battery.

In some embodiments, the silicon-based negative electrode material may be one or more selected from elemental silicon, a silicon-carbon composite, a silicon-oxygen compound, a silicon-nitrogen compound, and a silicon alloy. Optionally, the silicon-based negative electrode material may be selected from the silicon-oxygen compound. The theoretical gram capacity of the silicon-oxygen compound is about 7 times that of graphite, and as compared with the elemental silicon, the volume expansion of the silicon-oxygen compound during charging is greatly reduced, and the cycle stability of the battery is greatly improved.

In some embodiments, the tin-based negative electrode material may be one or more selected from elemental tin, a tin-oxygen compound, and a tin alloy.

In some embodiments, the negative electrode active material may have a volume average particle size WO of from 2 μm to 12 μm, for example, from 3 μm to 8 μm. Under the condition that WO of the negative electrode active material falls within the appropriate range, the consumption of active ions for forming film on a negative electrode is reduced, and further, the side reactions of the electrolyte on the negative electrode are reduced, thereby reducing irreversible capacity of the secondary battery. Moreover, it is also beneficial for improving the conductivity of active ions and electrons of the negative electrode active material, and it can also effectively reduce or prevent particles from breaking or pulverizing during charging and discharging, thereby further improving the cycle performance of the secondary battery. In addition, under the condition that the negative electrode active material have appropriate $D_v50$, the addition of a binder in the negative electrode can be reduced, which is beneficial for increasing the energy density of the secondary battery.

In some embodiments, the negative electrode active material may have a volume particle size distribution width $(D_v90-D_v10)/D_v50$ of from 0.5 to 2.5. Optionally, $(D_v90-D_v10)/D_v50$ of the negative electrode active material is from 0.8 to 2.0. Under the condition that the volume particle size distribution width of the negative electrode active material falls within the above range, the side reactions of a negative electrode film can be reduced, and the consumption of an electrolyte is reduced; moreover, the crack or break of the particles during charging and discharging could be reduced or prevented, thereby improving the structural stability of the material, and further improving the cycle performance of the battery.

In some embodiments, the negative electrode active material has a specific surface area BET of from 0.5 $m^2/g$ to 6 $m^2/g$, for example, from 0.8 $m^2/g$ to 5 $m^2/g$. Under the condition that the specific surface area of the negative electrode active material falls within the appropriate range, the material could have more active sites on the surface thereof; as a result, the electrochemical performance of the material is improved, so as to meet the requirements of the secondary battery for dynamics performance and rate performance; meanwhile, it is also beneficial for reducing the side reactions of the electrolyte on the negative electrode, and for reducing the consumption of active ions for forming film on the negative electrode, thereby further improving the cycle performance of the battery.

In some embodiments, the negative electrode active material has a compacted density of from 1.0 $g/cm^3$ to 2.0 $g/cm^3$, for example, from 1.2 $g/cm^3$ to 1.5 $g/cm^3$, measured under a pressure of 5 tons (equivalent to 49 KN). Under the condition that the compacted density of the negative electrode active material measured under the pressure of 5 tons (equivalent to 49 KN) falls within the above range, it is beneficial for increasing the energy density of the secondary battery.

In some embodiments, the negative electrode active material has a tap density of from 0.5 $g/cm^3$ to 1.5 $g/cm^3$, for example, from 0.6 $g/cm^3$ to 1.2 $g/cm^3$. Under the condition that the tap density of the negative electrode active material falls within the above range, it is beneficial for increasing the energy density of the secondary battery.

In this application, the contents of the sulfur element and the carbon element in the negative electrode active material can be measured by instruments and methods commonly known in the art. For example, the measurement can be conducted on HCS-140 infrared carbon-sulfur analyzer from Shanghai Dekai Instruments according to GB/T20123-2006/ISO 15350: 2000, and the detection precision meets the standards of Metrological Verification Regulation JJG395-1997.

In this application, the chemical bond of the polymer-modified coating layer in the negative electrode active material can be measured by instruments and methods commonly known in the art, such as Raman spectroscopy. The Raman spectrum of the negative electrode active material can be obtained by a Raman spectrometer (such as LabRAM HR Evolution type). The scattering peak of the negative electrode active material within a Raman shift range from 280 $cm^{-1}$ to 345 $cm^{-1}$ is attributable to the —S—C— bond. The —S—C— bond enables the coating layer to have relatively high toughness. The scattering peak of the negative electrode active material within a Raman shift range from 900 $cm^{-1}$ to 960 $cm^{-1}$ is attributable to the —S—S— bond. The —S—S— bond enables the coating layer to have relatively high active ion conductivity.

In this application, the particle size distributions $D_v10$, $D_v50$ and $D_v90$ of the negative electrode active material have the common meanings known in the art, and can be measured by instruments and methods commonly known in the art. For example, the particle size distribution is measured by a laser particle size analyzer, such as Mastersizer 3000 laser particle size analyzer from Malvern Instruments Co., Ltd., UK.

Physical definitions of $D_v10$, $D_v50$, and $D_v90$ are as follows:

$D_v10$: a corresponding particle size at which the cumulative volume distribution percentage of the negative electrode active material reaches 10%;

$D_v50$: a corresponding particle size at which the cumulative volume distribution percentage of the negative electrode active material reaches 50%; and $D_v90$: a corresponding particle size at which the cumulative volume distribution percentage of the negative electrode active material reaches 90%.

In the present application, the specific surface area of the negative electrode active material has a meaning commonly known in the art, and can be measured by instruments and methods commonly known in the art. For example, the specific surface area can be obtained by testing according to a method of nitrogen adsorption using a specific surface area analysis and test, with reference to standard GB/T 19587-2004 *Determination of the Specific Surface Area of Solids by Gas Adsorption Using the BET Method*, and then calculating it according to BET (Brunauer Emmett Teller) method, wherein the nitrogen adsorption using a specific surface area analysis and test can be carried out on specific surface and porosity analyzer of Tri Star II 3020 type from Micromeritics, USA.

In this application, the tap density of the negative electrode active material has a meaning commonly known in the art, and can be measured by instruments and methods commonly known in the art. For example, the tap density can be readily measured on a tap density tester, such as a BT-300 tap density tester.

In this application, the compacted density of the negative electrode active material has a meaning commonly known in the art, and can be measured by instruments and methods commonly known in the art. For example, the compacted density can be measured, with reference to standard GB/T24533-2009, on an electronic pressure tester, such as a UTM7305 electronic pressure tester, comprising the steps that 1 g of the negative electrode active material is weighed and added into a mold with a bottom area of 1.327 cm$^2$, 5 tons (equivalent to 49 KN) of pressure is applied and maintained for 30 s, then the pressure is relieved and maintained for 10 s, data is recorded, and the compacted density of the negative electrode active material is obtained by calculation.

The process for preparing a negative electrode active material in the present application is not particularly limited. In one embodiment, the process for preparing a negative electrode active material may include the steps of: (1) dissolving a polymer precursor in a solvent, and stirring until uniform dispersion, to obtain a solution of the polymer precursor; (2) adding a core material into the solution of the polymer precursor, and stirring, to obtain a mixed slurry, wherein the core material is one or more selected from a silicon-based negative electrode material and a tin-based negative electrode material; (3) placing the mixed solution into a wet coating machine, and drying it under an inert non-oxidizing gas atmosphere, to obtain a solid powder; and (4) mixing the solid powder with a certain mass of sulfur powder to obtain a mixture, and subjecting the mixture to heat treatment under an inert non-oxidizing gas atmosphere at a certain temperature for a period of time, to obtain the negative electrode active material.

In step (1), optionally, the polymer precursor is one or more selected from polystyrene, polyvinyl chloride, polyethylene, polyacrylonitrile, polyaniline, polyacetylene, and polyvinylidene chloride.

In step (1), optionally, the solvent is one or more selected from water, N-methyl pyrrolidone, xylene, toluene, and dimethylformamide.

In step (1), optionally, a ratio of a mass of the polymer precursor to a volume of the solvent is from 0.1 g/L to 20 g/L, for example, from 0.5 g/L to 10 g/L, 1 g/L to 8 g/L, 1 g/L to 6 g/L, 1 g/L to 4.8 g/L, or 1.7 g/L to 3.5 g/L, etc.

In step (2), optionally, a mass ratio of the core material to the polymer precursor is from 7 to 200, for example, from 12 to 100, or from 20 to 60, etc. The higher the mass content of the polymer precursor is, the greater the coating amount of the negative electrode active material is, and thus the higher the carbon element content in the final polymer-modified coating layer is. Nevertheless, if the mass content of the polymer precursor is too high, the negative electrode active material is prone to agglomeration during preparation, which negatively affects the conduction of active ions during charging and discharging. If the mass content of the polymer precursor is too low, it is difficult to achieve the effects of uniform coating and isolation from erosion of an electrolyte.

In step (3), optionally, the inert non-oxidizing gas atmosphere is one or more selected from nitrogen, chlorine, and nitrogen.

In step (3), optionally, the mixed slurry is dried at a temperature from 80° C. to 250° C., for example, from 110° C. to 200° C., or from 175° C. to 190° C., etc. The heating rate may be from 1° C./min to 10° C./min, for example, from 1° C./min to 5° C./min.

In step (4), optionally, the inert non-oxidizing gas atmosphere is one or more selected from nitrogen, chlorine, and nitrogen.

In step (4), optionally, a mass ratio of the sulfur powder to the polymer precursor is from 1 to 5, for example, from 2 to 4, 2 to 3, or 3 to 4, etc. The sulfur powder is mainly used for cross-linking reaction with the polymer precursor. If the mass content of the sulfur powder is too high, there will be residual sulfur powder in the polymer-modified coating layer, and the residual sulfur powder will undergo a completely irreversible chemical reaction with active ions, which negatively affects the cycle performance of the battery. If the mass content of the sulfur powder is too low, the cross-linking reaction between the sulfur powder and the polymer precursor is incomplete, thus the conduction of electrons and ions in the polymer-modified coating layer will be affected, and further the polarization of the battery will be increasing. Therefore, the performance of the battery would be negatively affected.

In step (4), the heat treatment temperature is from 250° C. to 450° C.; and optionally, the heat treatment temperature is from 300° C. to 450° C. Under the condition that the heat treatment temperature is too high, the polymer-modified coating layer tends to be completely carbonized, and the polymer-modified coating layer has deteriorated elasticity and toughness, and thus cannot adapt to the expansion and contraction of the silicon-based negative electrode material and the tin-based negative electrode material during charging and discharging, and cannot ensure the isolation of the surface of the negative electrode active material from the electrolyte, resulting in poor cycle performance of the battery.

In step (4), optionally, the heat treatment is carried out for from 2 h to 8 h. For example, the heat treatment is carried out for from 3 h to 5 h.

Second, a secondary battery according to the present application will be described.

The secondary battery of the present application includes a positive electrode plate, a negative electrode plate, a separator, an electrolyte. The negative electrode plate may include a negative electrode current collector and a negative electrode film disposed on at least one surface of the negative electrode current collector and including the negative electrode active material according to the first aspect of the present application. The negative electrode film may be disposed on one surface of the negative electrode current collector or on two surfaces of the negative electrode current collector. In addition to the negative electrode active material according to the first aspect of the present application, the negative electrode film may further include other negative electrode active materials, such as a carbon material. Optionally, the carbon material is one or more selected from graphite, soft carbon, hard carbon, mesocarbon microspheres, carbon fibers, and carbon nanotubes. The negative electrode film may further include a conductive agent and a binder, the type and content of the conductive agent and the binder are not specifically limited, and may be selected according to actual requirements. The type of the negative electrode current collector is also not specifically limited, and may be selected according to actual requirements.

In the secondary battery of the present application, the positive electrode plate may include a positive electrode current collector and a positive electrode film disposed on at least one surface of the positive electrode current collector and including a positive electrode active material. The positive electrode film may be disposed on one surface of the positive electrode current collector or on two surfaces of the positive electrode current collector. The positive electrode film may further include a conductive agent and a binder, the type and content of the conductive agent and the binder are not specifically limited, and may be selected according to actual requirements. The type of the positive electrode current collector is also not specifically limited, and may be selected according to actual requirements.

It should be noted that the secondary battery of the present application may be a lithium ion battery, a sodium ion battery, or any other secondaries battery that use the negative electrode active material according to the first aspect of the present application.

When the secondary battery is a lithium ion battery, the positive electrode active material may be selected from lithium cobalt oxides, lithium nickel oxides, lithium manganese oxides, lithium nickel manganese oxides, lithium nickel cobalt manganese oxides, lithium nickel cobalt aluminum oxides, lithium-containing phosphates with an olivine structure, etc., but the present application is not limited to these materials, what can also be used are other well-known traditional materials that can be used as positive electrode active materials for lithium ion batteries. These positive electrode active materials may be used alone, or be used in combination of two or more. Optionally, the positive electrode active material may be one or more selected from $LiCoO_2$, $LiNiO_2$, $LiMnO_2$, $LiMn_2O_4$, $LiN_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ (LFP), and $LiMnPO_4$.

When the secondary battery is a sodium ion battery, the positive electrode active material may be selected from a transition metal oxides $Na_xMO_2$ (where M is a transition metal and is preferably one or more selected from Mn, Fe, Ni, Co, V, Cu, and Cr, and $0<x\leq1$) a polyanionic material (phosphates, fluorophosphates, pyrophosphates, or sulfates), a Prussian blue material, etc. Nevertheless, the present application is not limited to these materials, what can also be used are other well-known traditional materials that can be used as positive electrode active materials for sodium ion batteries. These positive electrode active materials may be used alone, or be used in combination of two or more. Optionally, the positive electrode active material may be one or more selected from $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, a Prussian blue material, and materials having a general formula $A_aM_b(PO_4)_cO_xY_{3-x}$ (where A is one or more selected from $H^+$, $Li^+$, $Na^+$, $K^+$, and $NH_4^+$; M is a transition metal cation and is, for example, one or more selected from V, Ti, Mn, Fe, Co, Ni, Cu, and Zn; Y is a halogen anion and is, for example, one or more selected from F, Cl, and Br; and $0<a\leq4$, $0<b\leq2$, $1\leq c\leq3$, and $0\leq x\leq2$).

In the secondary battery of the present application, the separator is disposed between the positive electrode plate and the negative electrode plate for separation. The type of the separator is not specifically limited, and may be any separator material used in existing batteries, such as polyethylene, polypropylene, polyvinylidene fluoride and a multi-layer composite film thereof, but is not limited to these materials.

In the secondary battery of the present application, the type of the electrolyte is not specifically limited. The electrolyte may be a liquid electrolyte (also referred to as an electrolyte solution) or a solid electrolyte. Optionally, the electrolyte is a liquid electrolyte. The liquid electrolyte may include an electrolyte salt and an organic solvent. The types of the electrolyte salt and the organic solvent are not specifically limited, and may be selected according to actual requirements. The electrolyte may further include additives. The types of additives are not particularly limited, and may be negative electrode film-forming additives, positive electrode film-forming additives, or additives that can improve some performance of batteries, such as additives that improve overcharge performance of batteries, additives that improve high-temperature performance of batteries, and additives that improve low-temperature performance of batteries.

The secondary battery may be prepared according to a conventional method in the art. As an example, it may be prepared by dispersing a positive electrode active material and optional conductive agent and binder in a solvent, wherein the solvent may be N-methyl pyrrolidone, to form a uniform positive electrode slurry; coating the positive electrode slurry on a positive electrode current collector, and subjecting to drying, cold pressing, etc., to obtain a positive electrode plate; dispersing a negative electrode active material and optional conductive agent, binder and thickener in a solvent, wherein the solvent may be deionized water, to form a uniform negative electrode slurry; coating the negative electrode slurry on a negative electrode current collector, and subjecting to drying, cold pressing, etc., to obtain a negative electrode plate; and wounding (or laminating) the positive electrode plate, a separator, and the negative electrode plate in sequence, wherein the separator is positioned between the positive electrode plate and the negative electrode plate for isolation, to obtain an electrode assembly; placing the electrode assembly in an outer package, and injecting an electrolyte into the outer package, and sealing, to obtain a secondary battery.

The present application does not have particular limitation to the shape of the secondary battery. The secondary battery may be cylindrical, square, or in other arbitrary shape. FIG. 1 shows a secondary battery 5 of a square structure as an example.

In some embodiments, the secondary battery may include an outer package. The outer package is used for encapsulating the positive electrode plate, the negative electrode plate, and the electrolyte.

Figure 2:
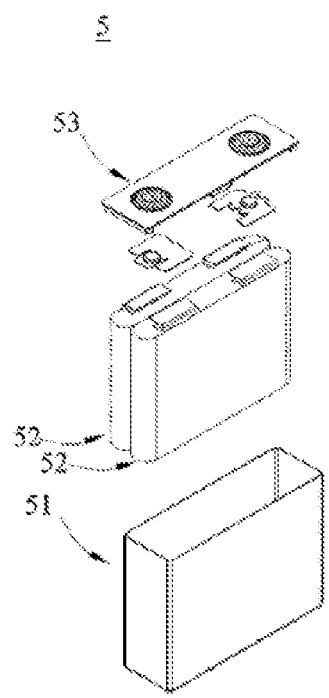
FIG. 2 is an exploded view of FIG. 1.

In some embodiments, referring to FIG. 2, the outer package may include a shell 51 and a cover plate 53. The shell 51 may include a bottom plate and side plates connected to the bottom plate, wherein the bottom plate and the side plates are united to form a receiving cavity. The shell 51 has an opening communicated with the receiving cavity, and the cover plate 53 can cover the opening to close the receiving cavity.

The positive electrode plate, the negative electrode plate and the separator may be wound or laminated to form an electrode assembly 52. The electrode assembly 52 is encapsulated in the receiving cavity. The electrolyte may adopt electrolyte solution, and the electrolyte solution infiltrates the electrode assembly 52. The secondary battery 5 includes one or more electrode assemblies 52, which can be adjusted according to requirements.

In some embodiments, the outer package of the secondary battery may be a hard case, such as a hard plastic case, an aluminum case, or a steel case. The outer package of the secondary battery may also be a soft bag, such as a pouch type soft bag. The material of the soft bag may be plastic, for example, including one or more of polypropylene (PP), polybutylene terephthalate (PBT), and polybutylene succinate (PBS).

In some embodiments, the secondary battery may be assembled to be a battery module, wherein the battery module may include a plurality of secondary batteries, and the specific number can be adjusted according to the application and capacity of the battery module.

Figure 3:
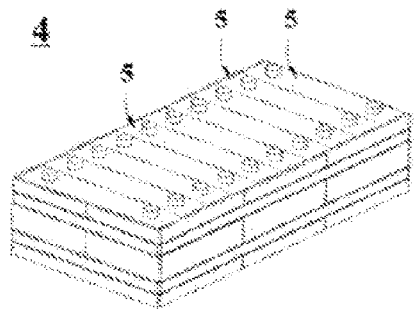
FIG. 3 is a schematic diagram of a battery module according to one embodiment.

FIG. 3 shows a battery module 4 as an example. Referring to FIG. 3, in battery module 4, a plurality of secondary batteries 5 may be arranged sequentially in a length direction of the battery module 4. Of course, they may also be arranged in any arbitrary way. Further, a plurality of secondary batteries 5 may be fixed by fasteners.

Optionally, the battery module 4 may further include a housing having a receiving space, with a plurality of secondary batteries 5 received in the receiving space.

In some embodiments, the above-mentioned battery module may also be assembled to be a battery pack, and the number of battery modules included in the battery pack may be adjusted according to the application and capacity of the battery pack.

Figure 4:
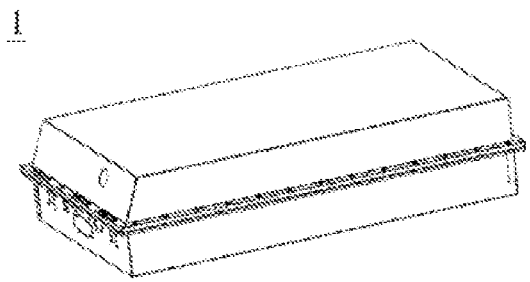
FIG. 4 is a schematic diagram of a battery pack according to one embodiment.
Figure 5:
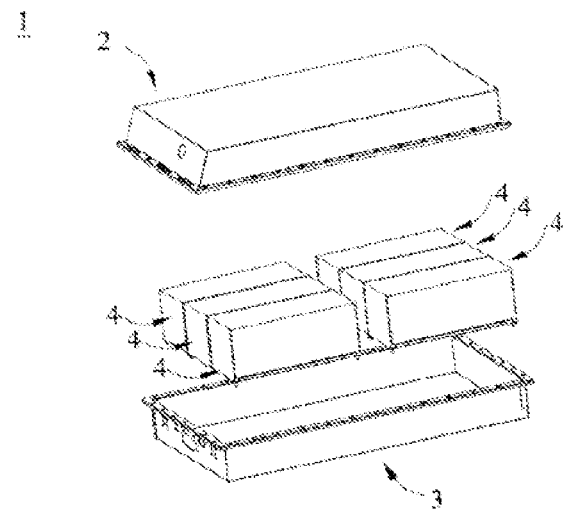
FIG. 5 is an exploded view of FIG. 4.

FIGS. 4 and 5 show a battery pack as an example. Referring to FIGS. 4 and 5, the battery pack 1 may include a battery case and a plurality of battery modules 4 disposed in the battery case. The battery case includes an upper case body 2 and a lower case body 3. The upper case body 2 may cover the lower case body 3, to form a closed space for receiving the battery modules 4. A plurality of battery modules 4 may be arranged in the battery case in any arbitrary manner.

The present application further provides an apparatus, comprising at least one of the secondary battery, the battery module, or the battery pack described in the present application. The secondary battery, the battery module, or the battery pack may be used as a power source for the apparatus, and may also be used as an energy storage unit for the apparatus. The apparatus may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck, etc.), an electric train, a ship, a satellite, an energy storage system, etc.

The secondary battery, the battery module, or the battery pack used in the apparatus may be selected according to requirements for using.

Figure 6:
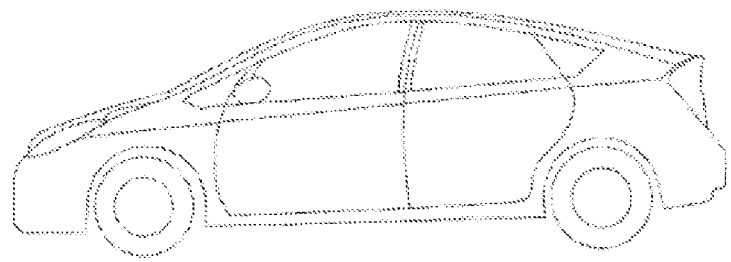
FIG. 6 is a schematic diagram of an apparatus using the secondary battery as a power source according to one embodiment.

FIG. 6 shows an apparatus as an example. The apparatus is a pure electric vehicle, a hybrid electric vehicle, or a plug-in hybrid electric vehicle, etc. In order to meet the requirements of the apparatus for high power and high energy density of the secondary battery, a battery pack or a battery module may be used.

As another example, the apparatus may be a mobile phone, a tablet computer, a notebook computer, etc. The apparatus is generally required to be thin and light, and thus the secondary battery can be used as a power source.

Hereinafter, the present application will be further explained in conjunction with examples. It should be understood that these examples are only used to illustrate the present application, but not to limit the scope of the present application.

Example 1

First, a negative electrode active material was prepared by:
(1) adding 1 g of polyacrylonitrile into 1000 mL of dimethylformamide, with stirring until all the polyacrylonitrile was dissolved, to obtain a solution;
(2) adding 100 g of silicon monoxide into the solution obtained in step (1), with stirring, to obtain a mixed slurry;
(3) heating the mixed slurry to 190° C. under an argon atmosphere, and holding the temperature for drying for 2 h, to obtain a solid powder; and
(4) weighing 3 g of sulfur powder to mix with the solid powder obtained in step (3), heating to 450° C. under an argon atmosphere to perform a heat treatment for 4 h, followed by cooling, thus obtaining the desired negative electrode active material.

Next, the prepared negative electrode active material was mixed with artificial graphite at a mass ratio of 3:7, and then further mixed with Super P as a conductive agent, sodium carboxymethyl cellulose (CMC-Na) as a thickener and styrene-butadiene rubber (SBR) as a binder at a mass ratio of 88:3:3:6, then deionized water as a solvent was added, and the system was stirred by a vacuum mixer until uniform, to obtain a slurry. The slurry was uniformly applied on a copper foil as a negative electrode current collector, then the copper foil coated with the slurry was transferred into a vacuum drying box for complete drying. And then the copper foil coated with the slurry after drying was rolled and punched to obtain a small wafer with certain area.

Afterwards, a button battery was obtained by assembling a lithium metal sheet as a counter electrode and a Celgard 2400 separator, and injecting electrolyte solution. The electrolyte solution was obtained as follows: uniformly mixing ethylene carbonate (EC), dimethyl carbonate (DMC), and diethyl carbonate (DEC) at a volume ratio of 1:1:1 to obtain an organic solvent; and dissolving $LiPF_6$ in the organic solvent and adding fluoroethylene carbonate (FEC) as an additive, wherein $LiPF_6$ had a concentration of 1 mol/L, and the FEC had a mass percentage of 6% in the electrolyte solution.

Button batteries of Examples 2-9 and Comparative Examples 1~4 were prepared by the same process as that of Example 1, and specific differences were shown in Table 1.

TABLE 1

Preparation parameters of negative electrode active materials of Examples 1-9 and Comparative Examples 1-4

| | Core material | | Polymer precursor | | Solvent | | Sulfur powder | Dry | | Heat treatment | |
|---|---|---|---|---|---|---|---|---|---|---|---|
| | Type | Mass g | Type | Mass g | Type | Volume mL | mass g | Temperature °C. | Time h | Temperature °C. | Time h |
| Example 1 | Silicon monoxide | 100 | Polyacrylonitrile | 1 | Dimethylformamide | 1000 | 3 | 190 | 2 | 450 | 4 |
| Example 2 | Silicon monoxide | 100 | Polyacrylonitrile | 1.7 | Dimethylformamide | 1000 | 5.1 | 190 | 2 | 450 | 4 |
| Example 3 | Silicon monoxide | 100 | Polyacrylonitrile | 2 | Dimethylformamide | 1000 | 6 | 190 | 2 | 450 | 4 |
| Example 4 | Silicon monoxide | 100 | Polyacrylonitrile | 3.5 | Dimethylformamide | 1000 | 10.5 | 190 | 2 | 450 | 4 |
| Example 5 | Silicon monoxide | 100 | Polyacrylonitrile | 4.8 | Dimethylformamide | 1000 | 14.4 | 190 | 2 | 450 | 4 |
| Example 6 | Silicon monoxide | 100 | Polyacrylonitrile | 6 | Dimethylformamide | 1000 | 18 | 190 | 2 | 450 | 4 |
| Example 7 | Silicon monoxide | 100 | Polyethylene | 2 | Xylene | 1000 | 8 | 175 | 2 | 315 | 3 |
| Example 8 | Silicon monoxide | 100 | Polystyrene | 9 | Toluene | 1000 | 20 | 140 | 2 | 310 | 4.5 |
| Example 9 | Silicon monoxide | 100 | Polyaniline | 8 | N-methyl pyrrolidone | 1000 | 19 | 230 | 2 | 370 | 3.5 |
| Comparative Example 1 | Silicon monoxide | 100 | Polyacrylonitrile | 3.5 | Dimethylformamide | 1000 | / | 190 | 2 | / | / |
| Comparative Example 2 | Silicon monoxide | 100 | Polyacrylonitrile | 3.5 | Dimethylformamide | 1000 | / | 190 | 2 | 1200 | 4 |
| Comparative Example 3 | Silicon monoxide | 100 | Polyacrylonitrile | 3.5 | Dimethylformamide | 1000 | 18 | 190 | 2 | 450 | 4 |
| Comparative Example 4 | Silicon monoxide | 100 | Polyacrylonitrile | 15 | Dimethylformamide | 1000 | 45 | 190 | 2 | 450 | 4 |

Next, performance tests of the negative electrode active material and the button battery will be described.

(1) Content Measurement of Sulfur Element and Carbon Element

Contents of sulfur element and carbon element in the negative electrode active material were measured by an infrared absorption method. The results were shown in Table 2. The content of sulfur element referred to a mass percentage of sulfur element in the negative electrode active material, and the content of carbon element referred to a mass percentage of carbon element in the negative electrode active material.

(2) Initial Coulombic Efficiency and Cycle Performance Test of the Button Battery The button battery was discharged at a constant current rate of 0.1 C to a voltage of 0.005 V and then was discharged at a constant current rate of 0.05 C to the voltage of 0.005 V at of 25° C. under normal pressure, and the specific discharge capacity at this time was recorded as the initial lithiation capacity. Then, the button battery was charged at the constant current rate of 0.1 C to a voltage of 1.5 V, and the specific charge capacity at this time was recorded as the initial delithiation capacity. The button battery was subjected to 50 cycles of charging and discharging test according to the above method, and the delithiation capacity for each test was recorded.

Initial coulombic efficiency of the negative electrode active material (%)=initial delithiation capacity/initial lithiation capacity×100%

Cycle capacity retention rate of the negative electrode active material (%)=delithiation capacity at $50^{th}$ cycle/initial delithiation capacity×100%

TABLE 2

Performance test results of Examples 1-9 and Comparative Examples 1-4

| | Negative electrode active material | | | | Button battery | |
|---|---|---|---|---|---|---|
| | Sulfur content | Carbon content | Is there a —S—C— bond | Is there a —S—S— bond | Initial Coulombic efficiency | capacity retention rate after 50 cycles |
| Example 1 | 0.51% | 0.58% | Yes | Yes | 79.07% | 93.60% |
| Example 2 | 0.84% | 0.97% | Yes | Yes | 81.77% | 97.34% |
| Example 3 | 1.15% | 1.18% | Yes | Yes | 82.96% | 98.40% |
| Example 4 | 1.91% | 1.82% | Yes | Yes | 81.49% | 96.20% |
| Example 5 | 2.86% | 2.67% | Yes | Yes | 79.43% | 95.87% |
| Example 6 | 3.97% | 3.86% | Yes | Yes | 76.87% | 91.70% |
| Example 7 | 0.80% | 1.90% | Yes | Yes | 75.11% | 89.40% |
| Example 8 | 3.00% | 2.70% | Yes | Yes | 78.32% | 97.10% |
| Example 9 | 2.00% | 2.80% | Yes | Yes | 76.29% | 90.60% |
| Comparative Example 1 | / | 2.01% | No | No | 73.58% | 88.20% |

TABLE 2-continued

Performance test results of Examples 1-9 and Comparative Examples 1-4

| | Negative electrode active material | | | Button battery | | |
|---|---|---|---|---|---|---|
| | Sulfur content | Carbon content | Is there a —S—C— bond | Is there a —S—S— bond | Initial Coulombic efficiency | capacity retention rate after 50 cycles |
| Comparative Example 2 | / | 2.12% | No | No | 75.08% | 90.40% |
| Comparative Example 3 | 4.23% | 1.85% | Yes | Yes | 72.01% | 87.30% |
| Comparative Example 4 | 6.15% | 6.27% | Yes | Yes | 70.96% | 84.40% |

From the test results shown in Table 2, it can be seen that the button batteries prepared in Examples 1-9 had improved initial coulombic efficiency and cycle performance.

A conventional polymer-modified coating layer was used in Comparative Example 1, thus the button battery had relatively low initial coulombic efficiency and poor cycle performance since the insulating property of the polymer itself would affect the conduction of lithium ions during charging and discharging.

In Comparative Example 2, the polymer precursor was subjected to heat treatment under a high temperature of 1200° C., and thus, the polymer was almost completely carbonized, so that the polymer-modified coating layer on the surface of the silicon-oxygen compound was almost an inorganic carbon layer, and the initial coulombic efficiency of the button battery was improved to a certain extent. However, the inorganic carbon layer had poor elasticity and toughness, and thus cannot well adapt to the expansion and contraction of the silicon-oxygen compound during charging and discharging. This resulted in easily breaking of the polymer-modified coating layer on the surface of the negative electrode active material, and meanwhile, would result in repeated breaking and repairing of, the SEI film on the surface of the negative electrode active material during charging and discharging. Accordingly, a large amount of lithium ions were consumed on the one hand; and on the other hand, the exposed negative electrode active material could be in direct contact with the electrolyte solution, causing increased side reactions on the surface of the negative electrode active material. Therefore, the cycle performance of the button battery deteriorated.

In Comparative Example 3, excessive sulfur powder was used when preparing the negative electrode active material, and thus, a large amount of sulfur powder remained in the polymer-modified coating layer, and the residual sulfur powder would undergo a completely irreversible chemical reaction with lithium ions, so that the button battery as prepared had relatively low initial Coulombic efficiency and poor cycle performance.

In Comparative Example 4, when preparing the negative electrode active material, the mass content of the polymer precursor was too high, and thus, the coating amount of the negative electrode active material was too large, and the contents of both carbon element and sulfur element in the polymer-modified coating layer were too high, so that the negative electrode active material was prone to agglomeration during the preparation, and the surface of the negative electrode active material were not be fully coated. During a charging and discharging cycle, negative electrode active material particles expanded, thus the agglomerated negative electrode active material particles gradually dispersed to expose a large area of uncoated fresh surface; and thus the consumption of lithium ions would accelerate accordingly. Therefore, the initial Coulombic efficiency of the button battery reduced and the cycle performance of the button battery deteriorated.

Some exemplary embodiments of the present invention are provided as follows:

Embodiment 1

A negative electrode active material, comprising a core material and a polymer-modified coating layer on at least part of a surface of the core material; wherein
the core material comprises one or more of a silicon-based negative electrode material and a tin-based negative electrode material;
the polymer-modified coating layer comprises sulfur element and carbon element;
the sulfur element has a mass percentage of from 0.2% to 4% in the negative electrode active material;
the carbon element has a mass percentage of from 0.5% to 4% in the negative electrode active material; and
the polymer-modified coating layer comprises —S—C— bond.

Embodiment 2

The negative electrode active material according to Embodiment 1, wherein the sulfur element has a mass percentage of from 0.7% to 2% in the negative electrode active material.

Embodiment 3

The negative electrode active material according to Embodiment 1 or 2, wherein the carbon element has a mass percentage of from 0.9% to 3% in the negative electrode active material.

Embodiment 4

The negative electrode active material according to any one of Embodiments 1 to 3, wherein the polymer-modified coating layer further comprises —S—S— bond.

Embodiment 5

The negative electrode active material according to any one of Embodiments 1 to 4, wherein the negative electrode active material has a volume average particle size $D_v50$ of from 2 μm to 12 μm, and optionally from 3 μm to 8 μm.

Embodiment 6

The negative electrode active material according to any one of Embodiments 1 to 5, wherein the negative electrode active material has a volume particle size distribution width $(D_v90-D_v10)/D_v50$ of from 0.5 to 2.5, and optionally from 0.8 to 2.0.

Embodiment 7

The negative electrode active material according to any one of Embodiments 1 to 6, wherein the negative electrode active material has a specific surface area BET of from 0.5 $m^2/g$ to 6 $m^2/g$, and optionally from 0.8 $m^2/g$ to 5 $m^2/g$.

Embodiment 8

The negative electrode active material according to any one of Embodiments 1 to 7, wherein the negative electrode active material has a compacted density of from 1.0 $g/cm^2$ to 2.0 $g/cm^2$, optionally from 1.2 $g/cm^3$ to 1.5 $g/cm^2$, measured under a pressure of 5 tons (equivalent to 49 KN).

Embodiment 9

The negative electrode active material according to any one of Embodiments 1 to 8, wherein the negative electrode active material has a tap density of from 0.5 $g/cm^3$ to 1.5 $g/cm^2$, and optionally from 0.6 $g/cm^3$ to 1.2 $g/cm^2$.

Embodiment 10

The negative electrode active material according to any one of Embodiments 1 to 9, wherein
the silicon-based negative electrode material is one or more selected from elemental silicon, a silicon-carbon composite, a silicon-oxygen compound, a silicon-nitrogen compound, and a silicon alloy; and optionally, the silicon-based negative electrode material is selected from the a silicon-oxygen compound; and
the tin-based negative electrode material is one or more selected from elemental tin, a tin-oxygen compound, and a tin alloy.

Embodiment 11

A process for preparing a negative electrode active material, comprising the following steps:
(1) dissolving a polymer precursor in a solvent, and stirring until uniform dispersion, to obtain a solution of the polymer precursor;
(2) adding a core material into the solution of the polymer precursor, and stirring, to obtain a mixed slurry, wherein the core material is one or more selected from a silicon-based negative electrode material and a tin-based negative electrode material;
(3) drying the mixed slurry in an inert non-oxidizing gas atmosphere, to obtain a solid powder; and
(4) mixing the solid powder with a sulfur powder to obtain a mixture, and subjecting the mixture to heat-treatment under an inert non-oxidizing gas atmosphere, to obtain the negative electrode active material;
wherein the negative electrode active material comprises the core material and a polymer-modified coating layer on at least part of a surface of the core material, the polymer-modified coating layer comprises sulfur element and carbon element, the sulfur element has a mass percentage of from 0.2% to 4% in the negative electrode active material, the carbon element has a mass percentage of from 0.5% to 4% in the negative electrode active material, and the polymer-modified coating layer comprises —S—C— bond.

Embodiment 12

The process according to Embodiment 11, wherein the polymer precursor comprises one or more of polystyrene, polyvinyl chloride, polyethylene, polyacrylonitrile, polyaniline, polyacetylene, and polyvinylidene chloride.

Embodiment 13

The process according to Embodiment 11 or 12, wherein in step (1), a ratio of a mass of the polymer precursor to a volume of the solvent is from 0.1 g/L to 20 g/L, and optionally from 0.5 g/L to 10 g/L.

Embodiment 14

The process according to any one of Embodiments 11 to 13, wherein in step (2), a mass ratio of the core material to the polymer precursor is from 7 to 200, and optionally from 12 to 100.

Embodiment 15

The process according to any one of Embodiments 11 to 14, wherein in step (4), a mass ratio of the sulfur powder to the polymer precursor is from 1 to 5, and optionally from 2 to 4.

Embodiment 16

The process according to any one of Embodiments 11 to 15, wherein the heat treatment is carried out at from 250° C. to 450° C., and optionally from 300° C. to 450° C.

Embodiment 17

The process according to any one of Embodiments 11 to 16, wherein the heat treatment is carried out for from 2 h to 8 h, and optionally from 3 h to 5 h.

Embodiment 18

A secondary battery, comprising the negative electrode active material according to any one of Embodiments 1 to 10 or the negative electrode active material obtained by the process according to any one of Embodiments 11 to 17.

Embodiment 19

A battery module, comprising the secondary battery according to Embodiment 18.

Embodiment 20

A battery pack, comprising the battery module according to Embodiment 19.

Embodiment 21

An apparatus, comprising at least one of the secondary battery according to Embodiment 18, the battery module according to Embodiment 19, or the battery pack according to Embodiment 20.

Based on the disclosure and teaching of the foregoing specification, those skilled in the art can also make changes and modifications to the foregoing embodiments. Therefore, this application is not limited to the specific embodiments disclosed and described above, and some modifications and changes to this application should also fall within the protection scope of the claims of this application. In addition, although some specific terms are used in this specification, these are only for convenience of description and do not constitute any limitation to this application.

What is claimed is:

1. A negative electrode active material, comprising a core material and a polymer-modified coating layer on at least part of a surface of the core material;
wherein
the core material comprises one or more of a silicon-based negative electrode material and a tin-based negative electrode material;
the polymer-modified coating layer comprises sulfur element and carbon element;
the sulfur element has a mass percentage of from 0.2% to 4% in the negative electrode active material;
the carbon element has a mass percentage of from 0.5% to 4% in the negative electrode active material;
the polymer-modified coating layer comprises —S—C— bond; and
the polymer-modified coating layer further comprises —S—S— bond.

2. The negative electrode active material according to claim 1, wherein the sulfur element has a mass percentage of from 0.7% to 2% in the negative electrode active material.

3. The negative electrode active material according to claim 1, wherein the carbon element has a mass percentage of from 0.9% to 3% in the negative electrode active material.

4. The negative electrode active material according to claim 1,
wherein the negative electrode active material has a volume average particle size $D_v50$ of from 2μm to 12 μ; and/or
wherein the negative electrode active material has a volume particle size distribution width $(D_v90 - D_v10)/D_v50$ of from 0.5 to 2.5; and/or
wherein the negative electrode active material has a specific surface area BET of from 0.5 m$^2$/g.

5. The negative electrode active material according to claim 1, wherein the negative electrode active material has a compacted density of from 1.0 g/cm$^3$ to 2.0 g/cm$^3$, measured under a pressure of 5 tons (equivalent to 49 KN) ; and/or wherein the negative electrode active material has a tap density of from 0.5 g/cm$^3$ to 1.5 g/cm$^3$.

6. The negative electrode active material according to claim 1, wherein the silicon-based negative electrode material is one or more selected from the group consisting of elemental silicon, a silicon-carbon composite, a silicon-oxygen compound, a silicon-nitrogen compound, and a silicon alloy; and the tin-based negative electrode material is one or more selected from the group consisting of elemental tin, a tin-oxygen compound, and a tin alloy.

7. A process for preparing a negative electrode active material, comprising the following steps:
(1) dissolving a polymer precursor in a solvent, and stirring until uniform dispersion, to obtain a solution of the polymer precursor;
(2) adding a core material into the solution of the polymer precursor, and stirring, to obtain a mixed slurry, wherein the core material is one or more selected from the group consisting of a silicon-based negative electrode material and a tin-based negative electrode material;
(3) drying the mixed slurry in an inert non-oxidizing gas atmosphere, to obtain a solid powder; and
(4) mixing the solid powder with a sulfur powder to obtain a mixture, and subjecting the mixture to heat-treatment under an inert non-oxidizing gas atmosphere, to obtain the negative electrode active material;
wherein the negative electrode active material comprises the core material and a polymer-modified coating layer on at least part of a surface of the core material, the polymer-modified coating layer comprises sulfur element and carbon element, the sulfur element has a mass percentage of from 0.2% to 4% in the negative electrode active material, the carbon element has a mass percentage of from 0.5% to 4% in the negative electrode active material, the polymer-modified coating layer comprises —S—C— bond, and the polymer-modified coating layer further comprises —S—S— bond.

8. The process according to claim 7, wherein in step (1), a ratio of a mass of the polymer precursor to a volume of the solvent is from 0.1 g/L to 20 g/L.

9. The process according to claim 7, wherein in step (2), a mass ratio of the core material to the polymer precursor is from 7 to 200.

10. The process according to claim 7, wherein in step (4), a mass ratio of the sulfur powder to the polymer precursor is from 1 to 5.

11. The process according to claim 7, wherein the heat treatment is carried out at from 250° C. to 450° C.

12. The process according to claim 11, wherein the heat treatment is carried out for from 2 h to 8 h.

13. A secondary battery, comprising the negative electrode active material according to claim 1.

14. An apparatus, comprising at least one of the secondary battery according to claim 13.

15. The process according to claim 7, wherein the polymer precursor comprises one or more of polystyrene, polyvinyl chloride, polyethylene, polyacrylonitrile, polyaniline, polyacetylene, and polyvinylidene chloride.

* * * * *